W. H. RANDALL.
STEERING WHEEL LOCK.
APPLICATION FILED JULY 13, 1916.
1,206,592.
Patented Nov. 28, 1916.
3 SHEETS—SHEET 1.
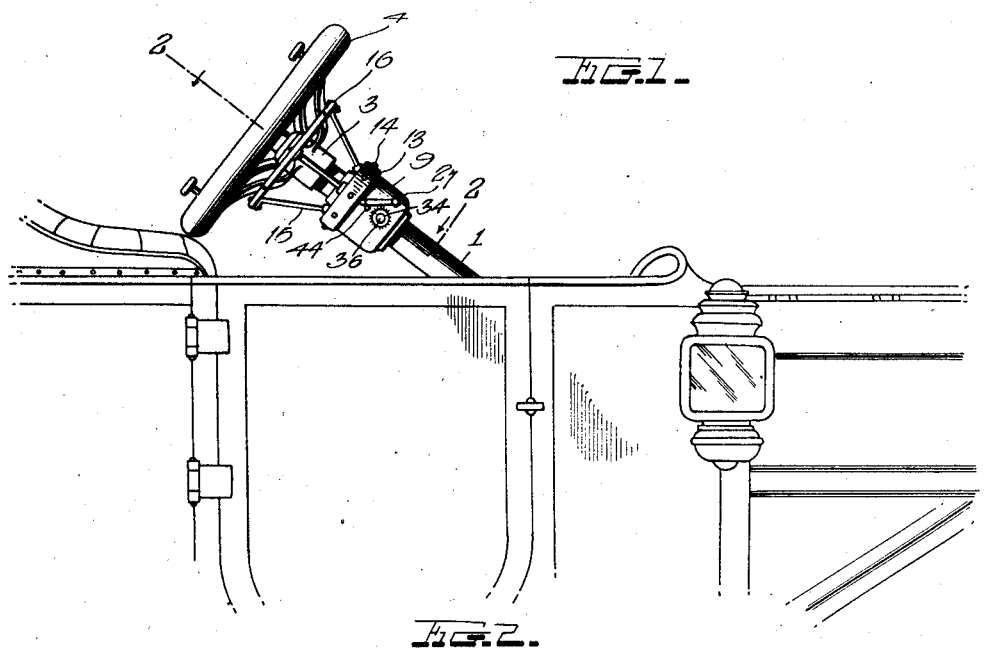
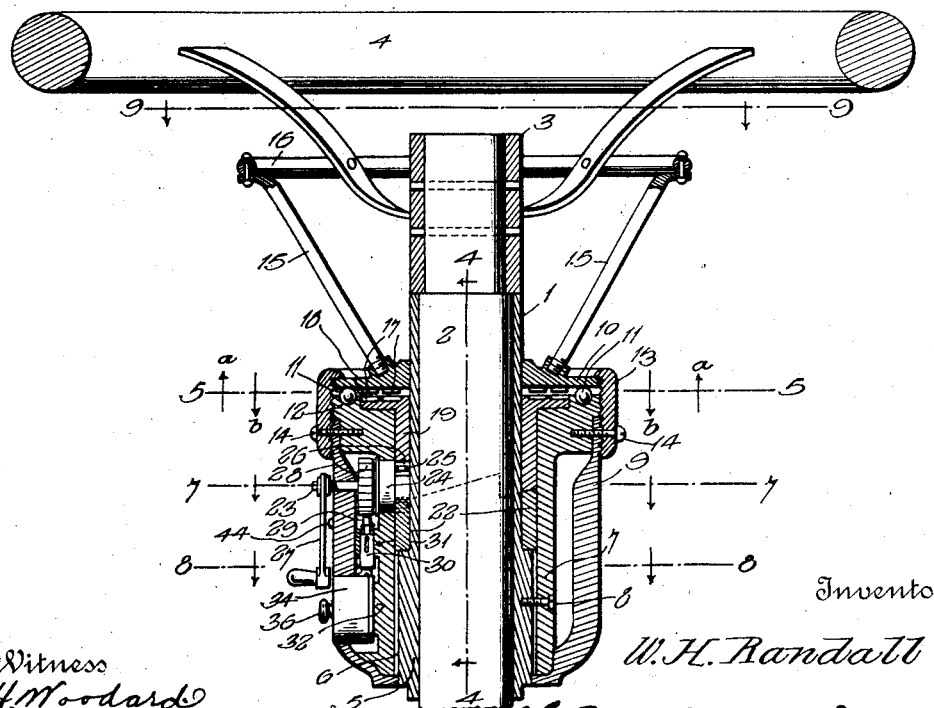
Witness
H. Woodard
Inventor
W. H. Randall
by H. B. Wilson & Co.
Attorneys W. H. RANDALL.
STEERING WHEEL LOCK.
APPLICATION FILED JULY 13, 1916.
1,206,592.
Patented Nov. 28, 1916.
3 SHEETS—SHEET 2.
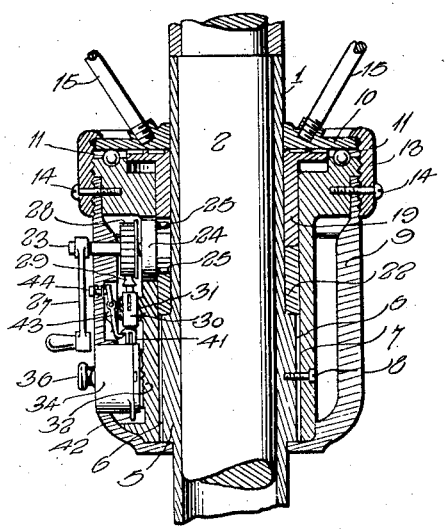
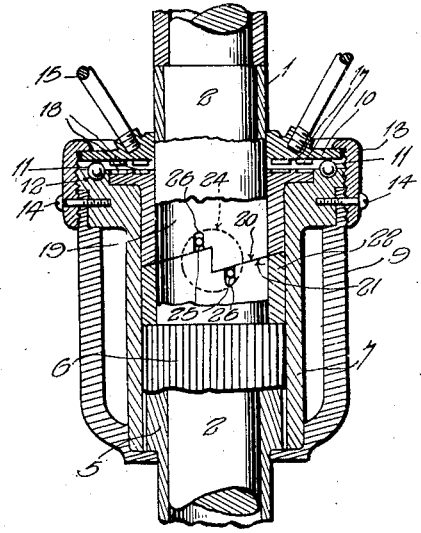
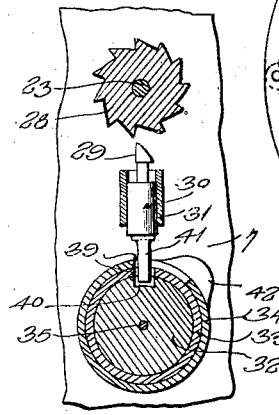
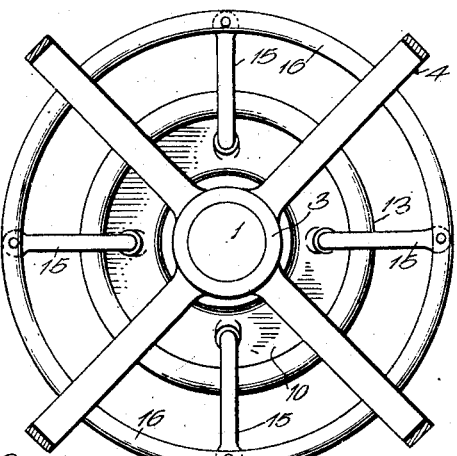
Witness
H. Woodard
Inventor
W. H. Randall
by H. B. Willson & Co.
Attorneys

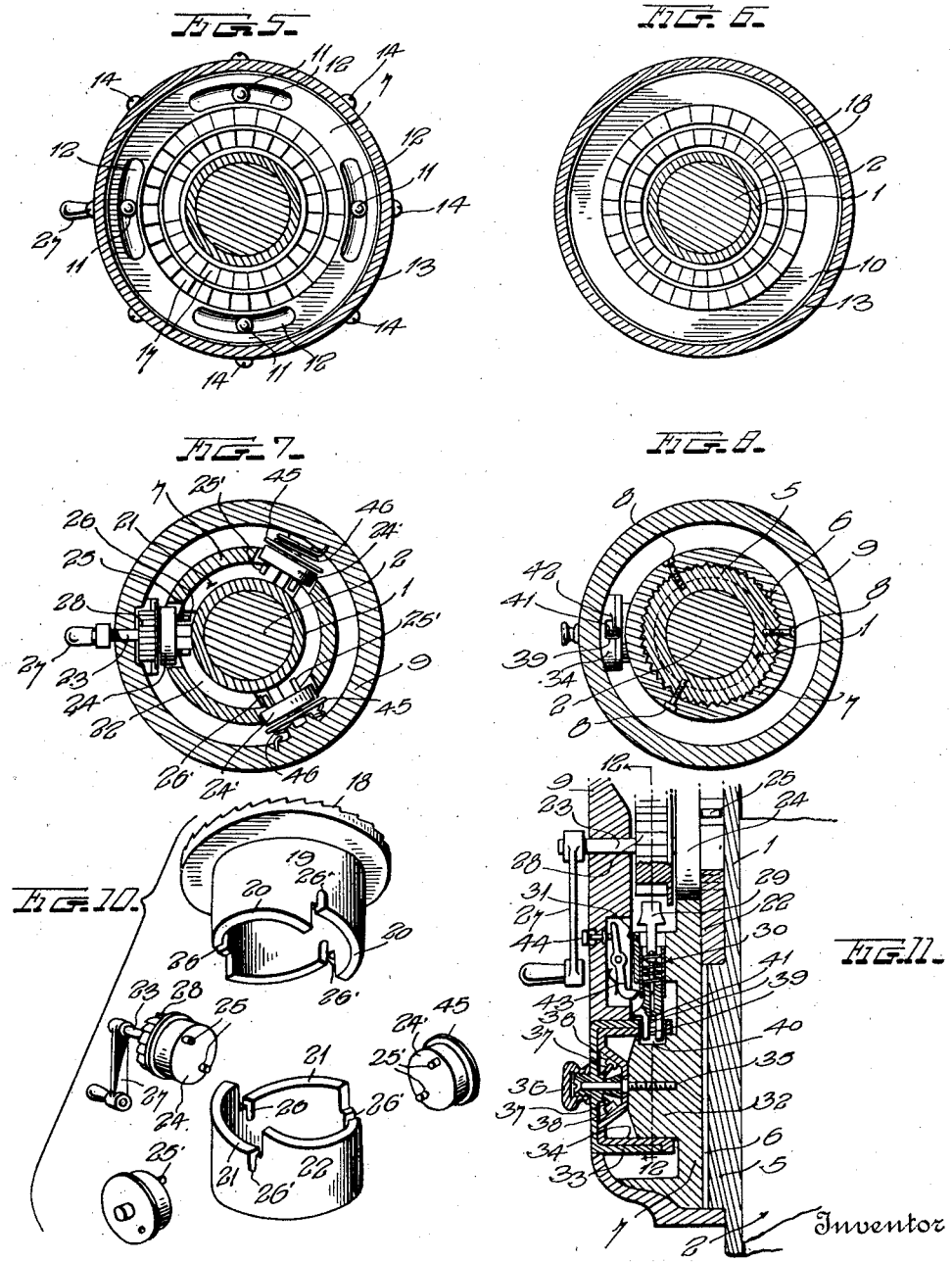

UNITED STATES PATENT OFFICE.

WILLIAM HENRY RANDALL, OF KANSAS CITY, KANSAS.

STEERING-WHEEL LOCK.

1,206,592.

Specification of Letters Patent. Patented Nov. 28, 1916.

Application filed July 13, 1916. Serial No. 109,113.

*To all whom it may concern:*

Be it known that I, WILLIAM H. RANDALL, a citizen of the United States, residing at Kansas City, in the county of Wyandotte and State of Kansas, have invented certain new and useful Improvements in Steering-Wheel Locks; and I do declare the following to be a full, clear, and exact description of the invention, such as will enable others skilled in the art to which it appertains to make and use the same.

My invention relates to improvements in devices for preventing unauthorized persons from running motor vehicles and the device pertains specifically to a lock for holding the steering wheel against movement, whereby driving of the car is impossible in any direction except that in which the front wheels are set when the device is locked.

The object of the invention is to provide a comparatively simple and inexpensive yet highly efficient and durable lock of the class described which may be easily applied or released at the will of the user.

With the foregoing general object in view, the invention resides in certain novel features of construction and in unique combinations of parts to be hereinafter fully described and claimed, the descriptive matter being supplemented by the accompanying drawings which constitute part of this application and in which:

Figure 1 is a side elevation of the invention applied to the steering wheel and post of an automobile; Fig. 2 is an enlarged vertical section thereof with the lock released; Fig. 3 is a similar view with said lock in position to lock the steering wheel; Fig. 4 is a sectional view cut at right angles to Figs. 2 and 3 on the plane of the line 4—4 of Fig. 2; Fig. 5 is a horizontal section on the plane of the line 5—5 of Fig. 2, looking in the direction of the arrows *a*; Fig. 6 is a similar view on the plane looking in the direction of the arrows *b*; Figs. 7, 8 and 9 are horizontal sections on the planes designated by the lines 7—7, 8—8 and 9—9 of Fig. 2; Fig. 10 is a disassembled perspective view of parts of the improved lock; Fig. 11 is a view similar to Fig. 3 on an enlarged scale; and Fig. 12 is a vertical section taken on the plane designated by the line 12—12 of Fig. 11.

In specifically describing the structure shown in the drawings above briefly described, similar characters will be employed to designate corresponding parts throughout the several views and reference will be herein made to the elements by their respective indices.

The numeral 1 has reference to a tubular steering post in which the steering shaft 2 is rotatably mounted, the upper end of said shaft having secured thereon in any preferred manner, the hub 3 of the steering wheel 4 which it is the intention of the present invention to lock against rotation.

The post 1 is shown as provided with an external enlargement 5 which as shown most clearly in Figs. 2 and 8, is provided with a plurality of longitudinally extending ribs 6 which intermesh with similar ribs on a vertically disposed sleeve 7, the latter being thus held against rotation and being secured against vertical movement by a set screw or the like 8 as depicted in Fig. 2. The upper end of sleeve 7 is enlarged and received in the open upper end of a cylindrical casing 9 which as shown contains practically all parts of the device.

A flat horizontal ring 10 overlies the upper end of sleeve 7 and preferably is supported on ball bearings 11 traveling in arcuate races 12 in the enlarged upper end of said sleeve. A guard ring 13 preferably surrounds the edge of the ring 10 and is threaded on the upper ends of the sleeve 7 and casing 9, being held against accidental movement by set screws or the like 14. A plurality of rods or arms 15 rise from the ring 10 and are secured at their upper ends to a ring 16 which is riveted or otherwise anchored to the spokes of the steering wheel 4, the lower side of said ring 10 being equipped with oppositely facing teeth 17 which are disposed in two annular series as will be clear from Figs. 2, 3, 4 and 5.

Coöperating with the teeth 7 to lock ring 10 against rotation and to thereby prevent such movement of the wheel 4, are additional teeth 18 on the flanged upper end of a tubular locking member 19 which is received slidably in the sleeve 7 and surrounds the post 1. Inclined cams 20 are formed on the lower end of the locking member 19 for coöperation with similar cams 21 on the upper end of a tubular member 22 disposed immediately below 19 and resting on the upper end of the enlargement 5. It will thus be clear that if the two members 19 and 22 are turned oppositely in the correct directions, the cams 20 and 21 will coact to elevate the member 19, thus throwing the teeth 18 thereof into mesh with the teeth 17 of ring 10. This ring and the parts secured thereto are thus held against movement but under normal circumstances when member 19 is lowered (see Fig. 2), free turning of the steering wheel is permitted.

An operating shaft 23 projects rotatably through the casing 9, said shaft carrying on its inner end a head 24 having inwardly projecting pins 25 spaced on opposite sides of its axis and received in notches 26 formed in the contacting ends of the members 19 and 22. The outer end of shaft 23 is provided with a crank or other appropriate handle 27 and it will thus be seen that as this handle is operated, the head 24 will be turned and thus its pins 25 will move the two members 19 and 22 in opposite directions to move the former upwardly for the purpose of engaging its teeth 18 with the teeth 17 on ring 10. Any means may be employed for locking shaft 23 against movement after once adjusted to lock the device but the structure now to be described is preferably employed.

A ratchet wheel 28 is secured on shaft 23 and disposed within the casing 9, said wheel coöperating with the spring projected upper section 29 of a locking bolt 30 which is slidably mounted in any suitable manner within the casing, said bolt being preferably received within a bore formed through an external lug 31 on the sleeve 7. Said sleeve has formed thereon a cylindrical boss 32 below the lug 31 and inner and outer telescoping tumbler members 33 and 34 pass through an opening in casing 9 and rotatably surround said boss, being held in this position by a screw 35 or by any other suitable means.

The outer tumbler member 34 is equipped with an operating knob 36 and has on its interior a pair of fingers 37 to coöperate with stops 38 on member 33, whereby rotation of said outer member in a predetermined manner will position the inner member at a fixed point, after which said outer member may be turned until it is properly set. Both of the tumbler members are formed with openings 39 which are adapted for registration with each other and with a cavity 40 in the periphery of the boss 32 when said tumbler members are set in the manner just described. This permits the lower section 41 of the locking bolt 30 to descend into the openings and cavity as shown in Fig. 11, thus retracting its upper section 29 from engagement with wheel 28. This permits the crank 27 to be rotated in the proper direction for lowering the member 19 to unlock the device. While turning said handle in the direction to project or elevate the locking member 19, the upper section 29 of the bolt 30 will be permitted to ride over the teeth of the wheel 28 due to the spring means for projecting said section.

For moving the locking bolt 30 to operative position after the same has been retracted as shown in Fig. 11, a cam 42 (see Figs. 3, 8 and 12) is provided on the outer tumbler member 34, said cam being adapted for reception in a notch in the lower end of section 41 to elevate the latter and thus project the entire bolt 30. The latter will be held in its raised operative position by a spring applied catch 43 which may be released from the exterior of the casing by means of a push button or the like 44.

Preferably used in conjunction with the parts above described are heads 24' similar to head 24, said heads being rotatably mounted in any preferred manner and having pins 25' received in notches 26' in the meeting edges of the members 19 and 22. The shafts of the heads 24' are equipped with disks 45 and coiled springs 46 are secured at one end to said disks and at their other ends to the casing 9, the tension of these springs serving to assist in returning all parts of the device to normal position when the bolt 30 is retracted by properly setting the combination lock and then releasing catch 43 by an inward push on button 44.

In operation, when it is desired to lock the wheel 4 against rotation, the outer tumbler member 34 is rotated to project the bolt 30 into engagement with the ratchet wheel 35 as shown in Fig. 3, whereupon the handle 27 will be turned to cause the head 24 to turn the members 19 and 22 in opposite directions. This raises said member 19 and engages its teeth 18 with the teeth 17, whereupon rotation of the wheel 4 is prevented. When the bolt 30 is raised, it will be held in this position by the catch 43 and when the lock is to be again released, both tumbler members will be set to aline their openings 39, and an inward push on button 44 will so move catch 43 as to release bolt 30, whereupon the latter will lower by gravity into the alining openings and its upper end will thus be free of the ratchet wheel. This permits the handle 27 to be turned in the direction to lower member 19 so that its teeth are disposed below those of the ring 10. During this return movement of parts, the springs 46 assist materially.

By constructing the improved lock in the manner shown and described, it will not only be comparatively simple and inexpensive, but will be highly efficient and durable and may be quickly and easily applied or released.

In the accompanying drawings, I have shown a number of specific details of structure for illustrative purposes and in the foregoing such details have been described, but it is to be understood that within the scope of the invention as claimed, numerous changes may be made without sacrificing the main advantages thereof.

I claim:

1. A steering wheel lock comprising a ring adapted to rotatably surround the steering post and to be rigidly secured to the steering wheel, a tubular locking member adapted to surround said post slidably below said ring, coacting locking teeth on said member and ring to be interengaged when the former is raised, an inclined cam on the lower end of said locking member, a second tubular member adapted to rotatably surround the post below said locking member, a second cam on said second member engaging the cam on said locking member, and means for rotating the two members in opposite directions to cause the cams to project the locking member.

2. A steering wheel lock comprising a ring adapted to rotatably surround the steering post and to be rigidly secured to the steering wheel, a tubular locking member adapted to surround said post slidably below said ring, coacting locking teeth on said member and ring to be interengaged when the former is raised, an inclined cam on the lower end of said locking member, a second tubular member adapted to rotatably surround the post below said locking member, a second cam on said second member engaging the cam on said locking member, the adjacent ends of both of said members having elongated apertures, a horizontal rotary shaft carrying at its inner end a head equipped with projections fitting into said apertures whereby rotation of said shaft will turn the two members in opposite directions to raise the locking member, and means for locking said shaft.

3. A steering wheel lock comprising a ring adapted to rotatably surround the steering post and to be rigidly secured to the steering wheel, a tubular locking member adapted to surround said post slidably below said ring, coacting locking teeth on said member and ring to be interengaged when the former is raised, an inclined cam on the lower end of said locking member, a second tubular member adapted to rotatably surround the post below said locking member, a second cam on said second member engaging the cam on said locking member, the adjacent ends of both of said members having elongated apertures, a horizontal rotary shaft carrying at its inner end a head equipped with projections fitting into said apertures whereby rotation of said shaft will turn the two members in opposite directions to raise the locking member, a toothed wheel secured on said shaft, a locking bolt coöperating with said wheel for securing the same against movement, and means for operating said bolt.

4. A steering wheel lock comprising a ring adapted to rotatably surround the steering post and to be rigidly secured to the steering wheel, a tubular locking member adapted to surround said post slidably below said ring, coacting locking teeth on said member and ring to be interengaged when the former is raised, an inclined cam on the lower end of said locking member, a second tubular member adapted to rotatably surround the post below said locking member, a second cam on said second member engaging the cam on said locking member, the adjacent ends of both of said members having elongated apertures, a horizontal rotary shaft carrying at its inner end a head equipped with projections fitting into said apertures whereby rotation of said shaft will turn the two members in opposite directions to raise the locking member, a ratchet wheel secured on said shaft, a locking bolt having a spring pressed section engaging the teeth of said wheel to hold the shaft against retrograde movement, and means for permitting retraction of said bolt.

5. A steering wheel lock comprising a ring adapted to rotatably surround the steering post and to be rigidly secured to the steering wheel, a tubular locking member adapted to surround said post slidably below said ring, coacting locking teeth on said member and ring to be interengaged when the former is raised, an inclined cam on the lower end of said locking member, a second tubular member adapted to rotatably surround the post below said locking member, a second cam on said second member engaging the cam on said locking member, the adjacent ends of both of said members having elongated apertures, a horizontal rotary shaft carrying at its inner end a head equipped with projections fitting into said apertures whereby rotation of said shaft will turn the two members in opposite directions to raise the locking member, a toothed wheel secured on said shaft, a locking bolt coöperating with said wheel to lock the shaft against movement, and a plurality of rotary tumblers having openings to be alined to permit retraction of said bolt.

6. A steering wheel lock comprising a ring adapted to rotatably surround the steering post and to be rigidly secured to the steering wheel, a tubular locking member adapted to surround said post slidably below said ring, coacting locking teeth on said member and ring to be interengaged when the former is raised, an inclined cam on the lower end of said locking member, a second tubular member adapted to rotatably surround the post below said locking member, a second cam on said second member engaging the cam on said locking member, the adjacent ends of both of said members having elongated apertures, a horizontal rotary shaft carrying at its inner end a head equipped with projections fitting into said apertures whereby rotation of said shaft will turn the two members in opposite directions to raise the locking member, a toothed wheel secured on said shaft, a locking bolt coöperating with said wheel to lock the shaft against movement, a plurality of rotary tumblers having openings adapted to be alined to permit retraction of the bolt, and a cam on one of said tumblers for again projecting said bolt.

In testimony whereof I have hereunto set my hand in the presence of two subscribing witnesses.

WILLIAM HENRY RANDALL.

Witnesses:
D. C. SPRECHER,
JAMES MCNAMARA.